United States Patent
Simpson et al.

(10) Patent No.: US 7,588,179 B2
(45) Date of Patent: Sep. 15, 2009

(54) BONDING OF CARBON FIBERS TO METAL INSERTS FOR USE IN COMPOSITES

(75) Inventors: Allen H. Simpson, Buchanan, MI (US); Mark L. La Forest, Granger, IN (US); Alexander Mukasyan, Granger, IN (US); Douglas J. Steinke, South Bend, IN (US)

(73) Assignee: Honeywell International Inc., Morris Township, NJ (US)

( * ) Notice: Subject to any disclaimer, the term of this patent is extended or adjusted under 35 U.S.C. 154(b) by 390 days.

(21) Appl. No.: 11/730,373

(22) Filed: Mar. 30, 2007

(65) Prior Publication Data

US 2008/0283174 A1  Nov. 20, 2008

(51) Int. Cl.
 *B23K 31/02* (2006.01)
(52) U.S. Cl. .................................. 228/234.3
(58) Field of Classification Search ................. 228/107, 228/234.3
See application file for complete search history.

(56) References Cited

U.S. PATENT DOCUMENTS

| | | | |
|---|---|---|---|
| 3,644,135 A | 2/1972 | Speyer | |
| 4,492,670 A | 1/1985 | Mizrah et al. | |
| 4,544,524 A | 10/1985 | Mizrah et al. | |
| 4,632,794 A | 12/1986 | Mori et al. | |
| 4,875,616 A | 10/1989 | Nixdorf | |
| 4,980,123 A | 12/1990 | Gedeon et al. | |
| 5,194,237 A * | 3/1993 | Cliche et al. | 423/440 |
| 5,506,061 A | 4/1996 | Kindl et al. | |
| 5,518,383 A | 5/1996 | Abiven | |
| 5,577,263 A | 11/1996 | West | |
| 5,611,477 A * | 3/1997 | Wang | 228/107 |
| 5,707,567 A | 1/1998 | Pfaff | |
| 5,832,360 A | 11/1998 | Andrews et al. | |
| 6,013,226 A | 1/2000 | Steel et al. | |
| 6,635,098 B2 | 10/2003 | Abkowitz et al. | |
| 7,090,706 B2 * | 8/2006 | Farahmandi et al. | 29/25.03 |

* cited by examiner

*Primary Examiner*—Jessica L Ward
*Assistant Examiner*—Megha Mehta
(74) *Attorney, Agent, or Firm*—Birch, Stewart, Kolasch & Birch, LLP

(57) ABSTRACT

Resin-impregnated carbon fiber composites containing metal inserts. Carbon fibers or a carbon fiber preform are bonded to a metal structural member. Once the carbon fiber-metal bond is established, the fiber-metal assembly or hybrid preform is impregnated with resin, to form an article in which bonding between the metal structural member and the composite remainder of the article is greatly enhanced. In a process embodiment, a metal insert, e.g. a steel insert, is provided in contact with particulate carbide-forming metal, e.g. titanium, and with carbon fiber segments. Then an electric current is passed through the carbide-forming metal particles and carbon fibers to heat them to a temperature above the melting point of the carbide-forming metal. This initiates an exothermic reaction, which forms liquid phase metal carbide. Subsequently the liquid phase metal carbide is cooled and solidified, thereby bonding the carbon fiber segments to the metal insert.

11 Claims, 3 Drawing Sheets

BONDING OF CARBON FIBERS TO METAL INSERTS FOR USE IN COMPOSITES

FIELD OF THE INVENTION

The present invention relates to resin-impregnated carbon fiber composites that contain metal inserts. This invention bonds carbon fibers or a carbon fiber preform to a metal structural member. Once the carbon fiber-metal bond is established, the fiber-metal assembly or hybrid preform is impregnated with resin, to form an article in which bonding between the metal structural member and the composite remainder of the article is greatly enhanced.

BACKGROUND OF THE INVENTION

Over the years, much technology has developed with respect to bonding involving metals. Some examples are discussed in this section, and are referred to again in the SUMMARY OF THE INVENTION section below.

U.S. Pat. No. 3,644,135 (Speyer) teaches a method of using an organometallic liquid, mixed with a strong acid, to impregnate cloth made of carbon fiber. When heated, the strong acid evaporates, leaving the organometallic material in place on the carbon fiber cloth. Upon further heating, the organometallic material decomposes, leaving only metal in place on the carbon fiber cloth. Still further heating causes the metal to react with the carbon fibers, producing carbided fibers. These carbided fibers are resistant to oxidation.

U.S. Pat. No. 4,875,616 (Nixdorf) teaches bonding ceramic to metal. The bonding layer is a preform of ceramic fibers. The preform is coated on one side with a metal matching the metal composition to be bonded, while the other side of the ceramic fiber preform is impregnated with ceramic powder of the same composition as the ceramic to be bonded. Then the preform is sandwiched and pressure bonded between the metal and the ceramic.

U.S. Pat. No. 4,980,123 (Gedeon) teaches bonding metal to metal or metal to metal matrix composites, using a thin layer of a dissimilar metal to increase the "wettability" at the bonded joint. This is essentially a welding process. No combustion reaction takes place.

U.S. Pat. No. 5,518,383 (Abiven) teaches creating metallized fibers by processing the fibers in a CVD furnace. The metallized fibers are then bonded to a metal reflective surface by diffusion welding. The Abiven process involves heating and very high pressures.

In technology that involves metal inserts situated in carbon composite parts (Such as brake discs or other components), metal inserts (e.g., made of stainless steel) built into the fiber-matrix products sometimes de-bond from the matrix, leading to failure of the composite assembly. The present invention provides a solution to this problem.

SUMMARY OF INVENTION

The present invention bonds carbon fiber "whiskers" to the metal insert via combustion synthesis techniques using a titanium carbide "glue". The stainless steel or other metal insert is then placed into the composite as it is being manufactured. Composites are manufactured by making carbon-fiber preforms in a desired shape, and then filling voids in the fibrous preform with a liquid resin matrix material. In accordance with this invention, the carbon fiber "whiskers" bonded to the metal insert bond into the matrix of the composite when the liquid matrix material, which is introduced in to the fiber preform, changes to solid phase.

The present invention bonds carbon fibers or a carbon fiber preform to a metal structural member. Once the carbon fiber-metal bond is established, the fiber-metal assembly or hybrid preform is impregnated with resin, such as epoxy or phenolic resin, to form an article in which bonding between the metal structural member and the composite remainder of the article is greatly enhanced. In conventional manufacturing, when metal inserts are built into resin-impregnated composites, they often debond from the composite due to differences in coefficients of expansion or insufficient bonding surface which break the metal-composite bonds, or sometimes simply because the metal-resin bond is inadequate, e.g. because it is of insufficient area in the metal-composite hybrid article in question. In the present invention, the resin is introduced into the metal-composite hybrid preform only after the metal has been securely bonded to carbon fibers in the composite. This creates a much stronger bond between the metal insert and the newly formed resin-impregnated composite article having the metal insert.

In contrast to the Speyer technology, the present invention does not carbide fibers. The only carbide in the present invention is at the bond point between metal and fiber. The present invention initiates combustion by means of an electrical current, not by heating materials in a furnace. Fibers treated in accordance with the present invention are not oxidation resistant. In contrast to the Nixdorf technology, the present invention bonds carbon fiber to metal using a ceramic bond created through an exothermic combustion reaction. Molten ceramic creates the bond when it "freezes". In contrast to the Gedeon technology, the present technology bonds carbon fiber to metal, using a combustion reaction to make a metal carbide (ceramic) joint between the carbon fiber and the metal. Only after the carbon fiber is bonded to the metal does the present invention incorporate the fiber into a composite through addition of matrix material. In contrast to the Abiven technology, this invention does not metallize fibers and does not use diffusion welding. In the present invention, for instance, a metal insert to be bonded to carbon fibers may be coated with a slurry containing titanium powder, and the powder then ignited. The titanium powder combusts, with the metal being the fuel and the carbon fiber being the oxidant. This combustion is highly exothermic, creating titanium carbide in liquid phase at a temperature above about 3000° C. When this liquid titanium carbide solidifies or "freezes", the bond between the carbon fibers and the metal insert is complete.

In a process embodiment, the present invention first provides a metal insert, e.g. a steel insert, in contact with particulate carbide-forming metal, e.g. titanium, and with carbon fiber segments. Then an electric current is passed through the carbide-forming metal particles and carbon fibers to heat them to a temperature above the melting point of the carbide-forming metal. This initiates an exothermic reaction, which forms liquid phase metal carbide. Subsequently the liquid phase metal carbide is cooled and solidified, thereby bonding the carbon fiber segments to the metal insert.

Another process embodiment of this invention is a method of making a carbon composite part. This method includes steps (a.) through (e.) as follows. Step (a.) is preparing a carbon-fiber preform having an opening therein for receiving an insert. Step (b.) involves positioning a steel insert coated with titanium and with carbon fiber segments in the opening within the carbon-fiber preform to form an insert-preform construct. The titanium coated onto the insert may be in the form of a foil, a filament, or a powder. Step (c.) includes pressing the insert into the opening, typically under pressure, and heating the carbon fibers to a temperature above the melting point of titanium by passing an electric current (e.g.

ranging from 2000 to 7000 amps per square inch of material to be ignited) through the insert-preform construct. The insert and carbon fibers may be heated in an inert atmosphere. This step initiates an exothermic reaction that forms liquid phase titanium carbide. Step (d.) involves allowing the liquid phase titanium carbide to "freeze", e.g. by cooling the insert-preform construct to a temperature below 2600° C., thereby bonding the carbon fiber segments to the metal insert. In step (e.), voids in the fibrous preform are filled with a liquid resin matrix material, such as an epoxy or phenolic resin.

Yet another process embodiment of the present invention is a method of making a carbon composite part, which includes the steps of: (a.) preparing a steel insert around which a carbon fiber preform is to be constructed and coating the steel insert with a carbide-forming metal; (b.) building a carbon fiber preform around the steel insert; (c.) heating the carbon fibers to the melting point of the carbide-forming metal by passing an electric current through them, thus initiating an exothermic self sustaining oxidation-reduction reaction that forms a liquid phase metal carbide in contact with the carbon fiber and with the steel insert; (d.) allowing the liquid phase metal carbide to cool below the melting point of the metal carbide material to firmly bond the carbon fibers to the steel insert; (e.) filling voids in the fibrous preform with a liquid resin matrix material. In step (a.) of this embodiment of the invention, the carbide-forming metal is preferably titanium, which may be coated onto the steel insert in the form of a foil or with a slurry of titanium powder, alginate, and water.

BRIEF DESCRIPTION OF THE DRAWINGS

The present invention will become more fully understood from the detailed description given hereinbelow and the accompanying drawings. The drawings are not to scale, and are given by way of illustration only. Accordingly, the drawings should not be construed as limiting the present invention.

DETAILED DESCRIPTION OF THE INVENTION

Figure 1:
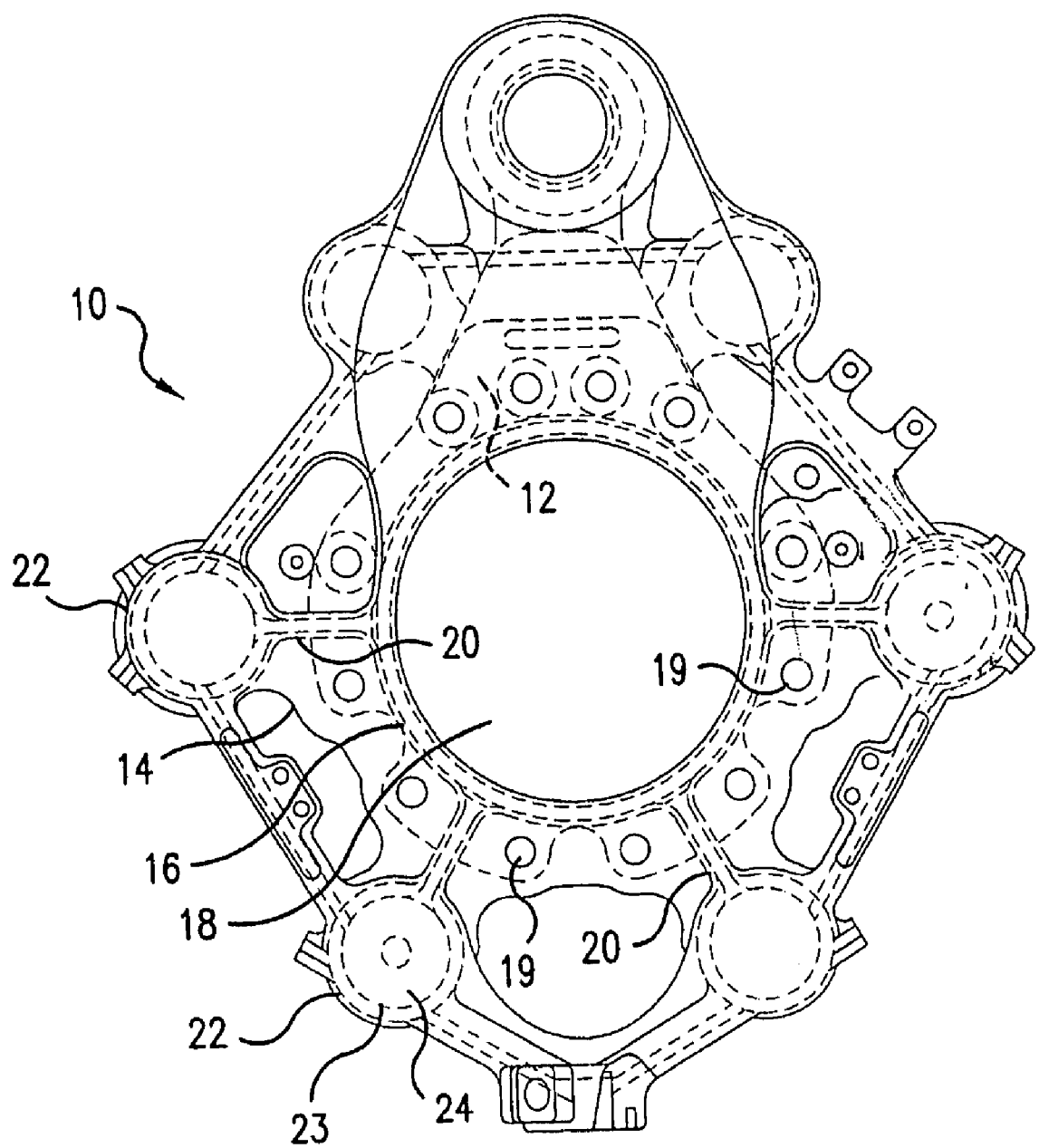
FIG. 1 is an elevational view of an aircraft brake piston housing including a frame embedded in a composite body which can be used in one embodiment of the present invention.

One example of an application for the present invention in the manufacture of a hybrid composite piston housing. Hybrid composite piston housings for aircraft brakes are described in detail in application Ser. No. 11/704,239, which was filed on Feb. 9, 2007 in the names of Douglas J. Steinke, et al. The entire disclosure of said application Ser. No. 11/704, 239 is hereby expressly incorporated by reference.

As explained in application Ser. No. 11/704,239, conventional piston housings are made entirely of metal. The technology described in application Ser. No. 11/704,239 enables a reduction in the amount of metal necessary to make the piston housings, and accordingly enables the manufacture of aircraft brake piston housings that are more lightweight than corresponding conventional housings. In that technology, a metal skeleton is provided for the housing, and the carbon composite is built up around the metal skeleton. The present invention describes a novel method by which the metal skeleton can be bonded into the hybrid composite piston housing. Of course, the present method can likewise be used in numerous other contexts in which a resin-impregnated carbon fiber composite that contains a metal insert is to be manufactured.

In accordance with this invention, a metal insert is coated with a powder that provides titanium metal and with carbon fibers. In one embodiment, a slurry containing titanium powder is painted onto the metal insert, and then the painted metal insert is dusted with carbon. In an alternate embodiment of this invention, the carbon fibers that are to be bonded to the metal insert are themselves coated with titanium powder before the powder is applied to the metal insert. The metal insert with its coating of carbon fiber "whiskers" and titanium is placed into the carbon fiber composite preform in a desired location. The coated metal insert is held firmly in place within the composite preform in an inert atmosphere, and the temperature at the interface is raised to the point at which melting and subsequent ignition of the titanium occurs. The temperature may be raised in this step by, for instance, passing an electric current through the fiber "whiskers" into the metal insert. As the titanium reaches its melting point, a highly exothermic oxidation-reduction reaction begins between the titanium and the carbon. This creates liquid phase titanium carbide at the interface of the carbon fibers to be bonded to the metal insert and the metal insert itself. However, the heat capacity of the metal insert is far greater than the heat generated by the oxidation-reduction reaction of the titanium and the carbon. As a result, the titanium carbide formed in the reaction cools quickly and without heating the metal insert to the melting point of the metal insert. In the case of iron, the iron is not annealed by the heat. When the titanium carbide formed between the metal insert and the carbon fiber is subsequently cooled to below 2600° C., a very strong bond is created between the metal insert and the carbon fiber "whiskers". Carbon fiber composites which include metal inserts treated in this way resist de-bonding from the carbon composite parts in which they are located. The technique is not limited to creating titanium carbide. Any carbide-forming metal may be used and the metal carbide system may be selected based on properties of the material and fibers to be joined.

Figure 2:
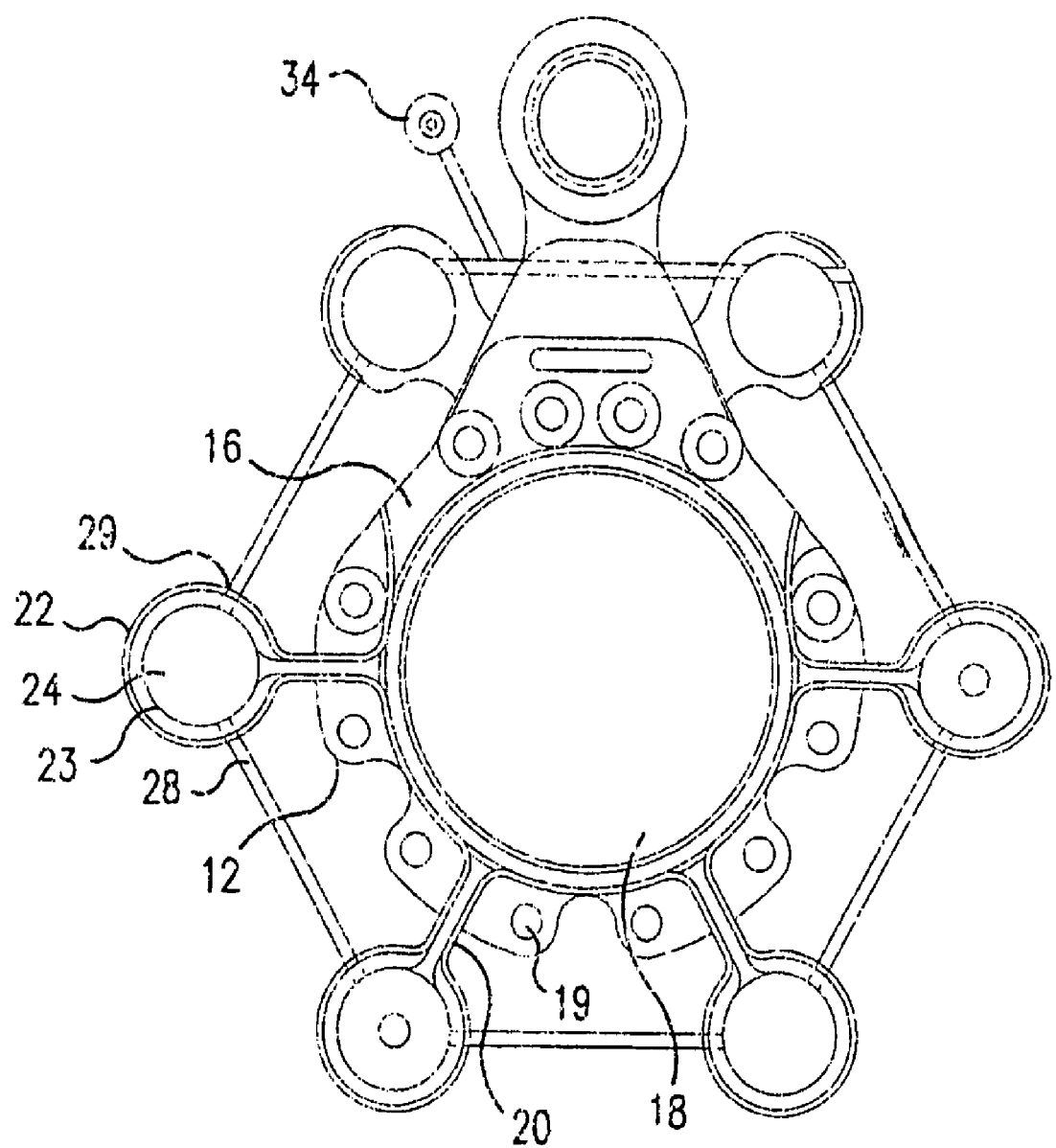
FIG. 2 is an elevational view of the frame, piston cups, and hydraulic lines of the hybrid composite piston housing of FIG. 1.

As indicated above, this invention provides a novel method by which a metal skeleton can be bonded into a hybrid composite piston housing. FIG. 1 illustrates a brake piston housing 10 comprising a metal frame 12 embedded in a body 14 formed of a composite material which may comprise reinforcing fibers in a resin. The resin may comprise, for example, an epoxy or phenolic resin, and the fibers may comprise, for example, carbon, glass, ceramic, or polymeric reinforcing fibers such as SPECTRA and KEVLAR. Frame 12 is illustrated in FIG. 2 without the surrounding composite material. Frame 12 may be formed, for example, from aluminum or another rigid metal. Frame 12 includes a central body portion 16 defining a central opening 18, a plurality of bolt holes 19, and a plurality of arms 20 extending from the central body portion 16 which arms terminate in rings or ring members 22. The rings 22 define openings 23 adapted to receive metal cylindrical inserts 24 which in turn contain a brake piston (not shown) and a tension spring (not shown) that holds the piston in a retracted position within cylindrical insert 24 under normal circumstances. Each of the cylindrical inserts 24 includes at least one opening 29 in a wall thereof to which a metal hydraulic fluid line 28 is connected. The cylindrical inserts 24 may include a pair of openings 29, a first for receiving hydraulic fluid and a second for conveying hydraulic fluid and/or pressure to adjoining cylindrical inserts 24 for operating the brake pistons 26 mounted therein. Hydraulic fluid is supplied to the hydraulic fluid lines 28 and brake pistons 26 via fitting 34.

Figure 3:
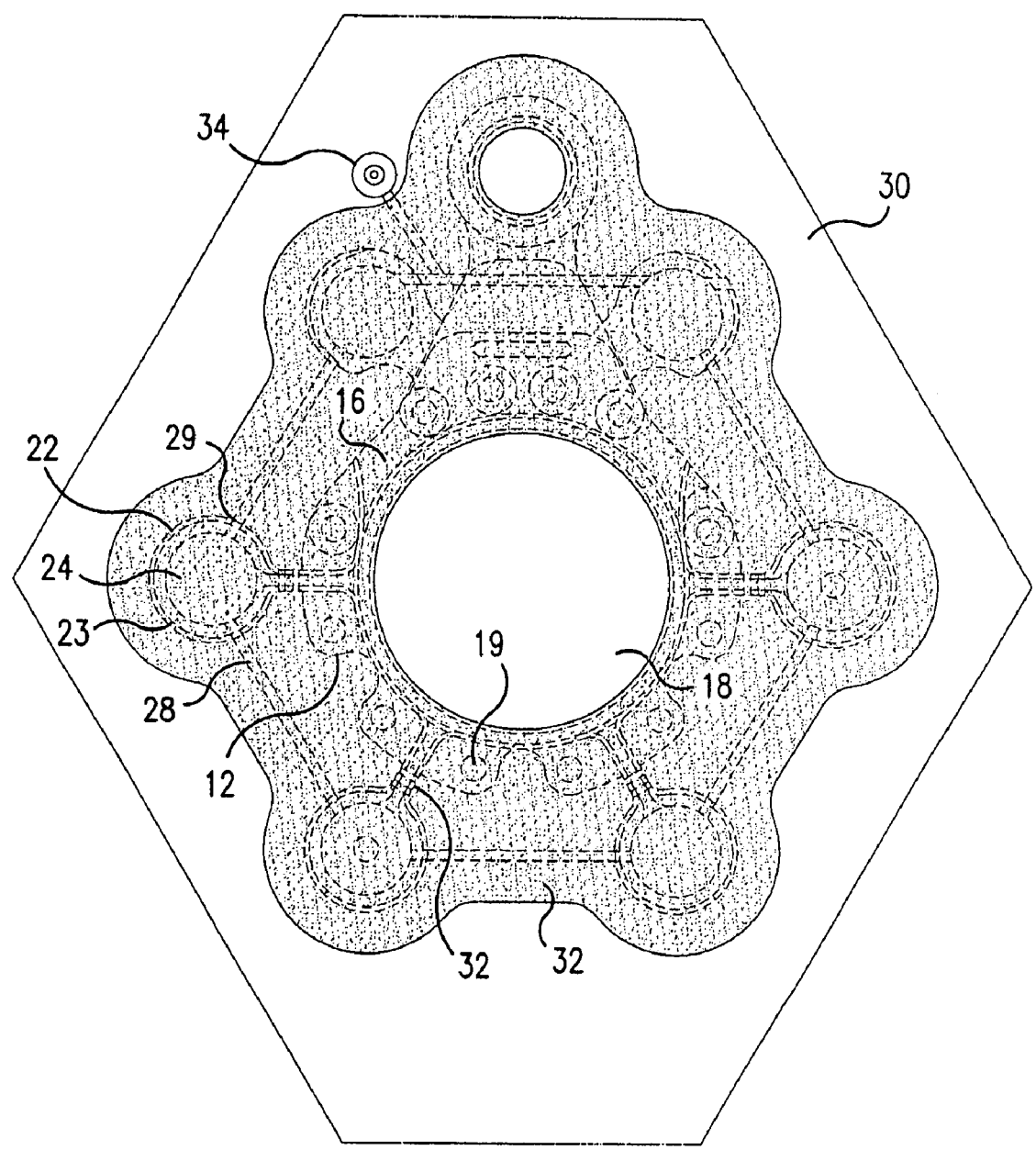
FIG. 3 schematically illustrates the frame of FIG. 2 positioned in a mold and covered with reinforcing fibers and resin during a molding process.

FIG. 3 illustrates a mold 30 into which frame 12 is placed during the process of forming brake piston housing 10. Reinforcing fibers 32 are added to mold 30. These fibers may be loosely placed into the spaces surrounding arms 20 and central body portion 10 or, as illustrated in FIG. 3, some or all elements of metal frame 12 and metal cylindrical inserts 24 may first be wound with one or more fibers 32 which may improve the mechanical bond between composite body 10 and frame 12. In accordance with the present invention, frame 12 and cylindrical inserts 24 are coated with particulate carbide-forming metal titanium prior to their insertion into mold 30. Subsequently, an electric current is passed through the carbide-forming metal particles and the carbon fibers 32 to heat them to a temperature above the melting point of the carbide-forming metal and thereby initiate an exothermic reaction forming liquid phase metal carbide. Upon cooling and solidification of the liquid phase metal carbide, carbon fiber segments 32 are bonded to the metal frame 12 and the cylindrical inserts 24. At this point, the mold is closed with a second mold element (not shown) and a suitable resin is poured or injected into the mold and cured or allowed to cure in a well known manner. It should be understood that this description of the present invention in the context of a hybrid composite aircraft bake piston housing is illustrative only. The present invention can be used in many other contexts, as is readily apparent from disclosure throughout the present application.

An apparatus for and the use of electric currents for combustion synthesis of titanium or other particulate metals in the manufacture of carbon fiber composites is disclosed in application Ser. No. 11/583,922, filed Oct. 20, 2006 in the names of Slawomir T. Fryska, et al. The entire disclosure of said application Ser. No. 11/583,922 is hereby expressly incorporated by reference.

In the present invention, typical electric currents range from 2000 to 7000 amps per square inch of material to be ignited. The duration of application of current will range from 1 to 10 seconds, and can readily be determined empirically for each particular implementation of the present invention. Among the factors that affect the strength and duration of current to be used are the heat capacity and thermal conductivity of the metal piece to which the fiber is being bonded. Filament ignition in accordance with this invention (illustrated in Example 1 below) will generally employ electric currents of less than 300 amps for less than 20 seconds.

EXAMPLE 1

A piece of steel 4 inches square has one side painted with a slurry. The slurry is an alginate solution containing 4 parts titanium by mass to 1 part water and one part alginate. A 1 millimeter thick layer is applied to one side of the steel. The steel is then placed in an oven and air dried at 250 C for one least hour, then removed and allowed to cool before further processing A tungsten filament is laid on top of the steel on the slurry coated side. A carbon fiber preform also 4 inches square and 1 inch thick is pressed against the side of the steel with the slurry coating with a force of between ½ psi and 100 psi. Ideally the next step is done in a vacuum or under a non-reactive atmosphere, but may be done successfully in air. An electrical current is passed through the tungsten filament heating the titanium in contact with the filament to its melting point. At the melting point a self-sustaining exothermic reaction between the titanium and the carbon fiber is initiated which propagates across the interface between the steel and the carbon fiber. The reaction forms liquid titanium carbide that rapidly freezes bonding the carbon fiber to the steel. The steel and the unreacted carbon fiber rapidly absorb the heat cooling the entire assembly to below the freezing point of the titanium carbide. The assembly is then allowed to cool to ambient temperature for further processing. The assembly may then be infused with polymer resin which subsequently hardens. The resin may be epoxy, phenolic, or any other resin commonly known to those skilled in the art. The result is a hybrid steel composite material which precludes de-bonding of the composite from the steel.

EXAMPLE 2

A piece of steel 4 inches square is laid on a bench with a 4 inch square surface in a horizontal plane. A 500 micron thick layer of titanium powder is spread evenly onto the steel. A carbon fiber filament is laid on top of the steel atop the powder. A carbon fiber preform also 4 inches square and 1 inch thick is pressed against the side of the steel with the powder layer with a force of between ½ psi and 100 psi. Ideally the next step is done in a vacuum or under a non-reactive atmosphere, but may be done successfully in air. An electrical current is passed through the carbon fiber filament heating the titanium in contact with the filament to its melting point. At the melting point a self-sustaining exothermic reaction between the titanium and the carbon fiber is initiated which propagates across the interface between the steel and the carbon fiber. From this point the reaction proceeds as in example 1

EXAMPLE 3

A piece of steel 4 inches square is laid on a bench with a 4 inch square surface in a horizontal plane. A 500 micron thick layer of titanium powder is spread evenly onto the steel. A carbon fiber preform also 4 inches square and 1 inch thick is pressed against the side of the steel with the powder layer with a force of between ½ psi and 100 psi. Ideally the next step is done in a vacuum or under a non-reactive atmosphere, but may be done successfully in air. An electrical current is passed through the steel, the titanium powder and the carbon fiber preform which act as series connected resistors. The optimum current is determined based on experiments and is influenced by the nature of the carbon fiber preform, the thickness of the powder layer and the particle size of the powder layer. The current preferentially heats the powder layer as it has higher electrical resistance than do the steel and the carbon fiber preform. When the electrical current heats the titanium powder to its melting point a self-sustaining exothermic reaction between the titanium and the carbon fiber is initiated which propagates across the interface between the steel and the carbon fiber. From this point the reaction proceeds as in example 1

EXAMPLE 4

A piece of steel 4 inches square is laid on a bench with a 4 inch square surface in a horizontal plane. A thin (25 micron) titanium foil is laid upon the steel and is also 4 inches square. A carbon fiber preform also 4 inches square and 1 inch thick is pressed against foil layer with a force of between ¼ psi and 100 psi sandwiching the foil between the steel and the carbon fiber preform. Ideally the next step is done in a vacuum or under a non-reactive atmosphere, but may be done successfully in air. An electrical current is passed through the steel, the titanium foil and the carbon fiber preform which act as series connected resistors. The optimum current is determined based on experiments and is influenced by the nature of the carbon fiber preform, the thickness of the foil. The current preferentially heats the foil layer at the interface where carbon fibers contact the foil. Again, when the joule heat melts the titanium foil at the interface a reaction starts that proceeds as in example 1.

EXAMPLE 5

A rectangular piece of steel 12 inches by 24 inches and ½ inch thick is laid horizontally. A titanium foil 25 micron thick is cut to the same dimensions as the steel and laid over the steel. A piece of carbon felt also 12 inches by 24 inches is placed over the foil. A conductive metal roller over 12 inches wide is placed at one end of the materials. A downward force is applied through the roller to the carbon felt, the titanium foil and the steel. Heat is applied to initiate the combustion reaction through use of an electrical current through the interface or use of a filament as was done in examples 1 through 4. The combustion then propagates along the interface between the carbon felt, the foil and the steel. The roller is moved along at the same rate as the combustion front travels to insure contact and that bonding is successful.

The present invention has been described herein in terms of preferred embodiments. However, obvious modifications and additions to the invention will become apparent to those skilled in the relevant arts upon a reading and understanding of the foregoing description. It is intended that all such modifications and additions form a part of the present invention to the extent that they fall within the scope of the several claims appended hereto.

What is claimed is:

1. Providing a metal insert in contact with particulate carbide-forming metal and with carbon fiber segments, and passing an electric current through the carbide-forming metal particles and carbon fibers to heat them to a temperature above the melting point of the carbide-forming metal and thereby initiate an exothermic reaction forming liquid phase metal carbide, and subsequently cooling and solidifying the liquid phase metal carbide, thereby bonding the carbon fiber segments to the metal insert.

2. The method of claim 1, wherein the metal insert is steel and the carbide-forming metal is titanium.

3. A method of making a carbon composite part, which comprises the steps of:
  (a.) preparing a carbon-fiber preform having an opening therein for receiving an insert;
  (b.) positioning a steel insert coated with titanium and with carbon fiber segments in the opening within said carbon-fiber preform to form an insert-preform construct;
  (c.) pressing said insert into said opening and heating said carbon fibers to a temperature above the melting point of titanium by passing an electric current through the insert-preform construct, thereby initiating an exothermic reaction that forms liquid phase titanium carbide;
  (d.) allowing the liquid phase titanium carbide to freeze, thereby bonding the carbon fiber segments to the metal insert; and
  (e.) filling voids in the fibrous preform with a liquid resin matrix material.

4. The method of claim 3, wherein the titanium coated onto the insert in step (b.) is a foil, a filament, or a powder.

5. The method of claim 3, wherein the electric current ranges from 2000 to 7000 amps per square inch of material to be ignited.

6. The method of claim 3, wherein in step (c.) the insert and carbon fibers are heated in an inert atmosphere.

7. The method of claim 3, wherein step (d.) is conducted by cooling said insert-preform construct to a temperature below 2600° C.

8. The method of claim 3, wherein the liquid resin matrix material in step (e.) is epoxy or phenolic resin.

9. A method of making a carbon composite part, which comprises the steps of:
  (a.) preparing a steel insert around which a carbon fiber preform is to be constructed and coating the steel insert with a carbide-forming metal;
  (b.) building a carbon fiber preform around the steel insert;
  (c.) heating the carbon fibers to the melting point of the carbide-forming metal by passing an electric current through them, thus initiating an exothermic self sustaining oxidation-reduction reaction that forms a liquid phase metal carbide in contact with the carbon fiber and with the steel insert;
  (d.) allowing the liquid phase metal carbide to cool below the melting point of the metal carbide material to firmly bond the carbon fibers to the steel insert;
  (e.) filling voids in the fibrous preform with a liquid resin matrix material.

10. The method of claim 9, wherein the carbide-forming metal is titanium and the steel insert is coated with a slurry of titanium powder, alginate, and water.

11. The method of claim 9, wherein the carbide-forming metal is titanium and the steel insert is coated with a titanium foil.

* * * * *